US012505234B1

(12) United States Patent
Chen

(10) Patent No.: US 12,505,234 B1
(45) Date of Patent: Dec. 23, 2025

(54) METHOD AND SYSTEM OF IDENTIFYING SECURITY ENCRYPTION ALGORITHM

(71) Applicant: Chelpis Quantum Corporation, Taipei (TW)

(72) Inventor: Bo-Wei Chen, Taipei (TW)

(73) Assignee: Chelpis Quantum Corporation, Taipei (TW)

( * ) Notice: Subject to any disclaimer, the term of this patent is extended or adjusted under 35 U.S.C. 154(b) by 42 days.

(21) Appl. No.: 18/753,837

(22) Filed: Jun. 25, 2024

(51) Int. Cl.
*G06F 21/60* (2013.01)
*G06F 21/62* (2013.01)

(52) U.S. Cl.
CPC ........ *G06F 21/602* (2013.01); *G06F 21/6218* (2013.01)

(58) Field of Classification Search
CPC ............................ G06F 21/602; G06F 21/6218
USPC ........................................................... 726/26
See application file for complete search history.

(56) References Cited

U.S. PATENT DOCUMENTS

| | | | | |
|---|---|---|---|---|
| 2003/0212913 A1* | 11/2003 | Vella | ...................... | H04L 63/145 726/24 |
| 2009/0327743 A1* | 12/2009 | Finlayson | ............... | G06F 21/32 713/186 |
| 2010/0257372 A1* | 10/2010 | Seifert | ................ | G06F 21/6218 713/189 |
| 2013/0276110 A1* | 10/2013 | Dalcher | ................ | G06F 21/554 726/23 |
| 2018/0218153 A1* | 8/2018 | Edwards | ............... | G06F 21/566 |

* cited by examiner

*Primary Examiner* — Dereena T Cattungal
(74) *Attorney, Agent, or Firm* — Che-Yang Chen; Law Offie of Michael Chen

(57) ABSTRACT

Provided are security encryption algorithm identification method and system, including: an electronic device having a software app, a downloadable storage unit for storing a dynamic-link library (DLL), and a scanning module for scanning the DLL to obtain DLL filename information; a cryptography DLL list, with the scanning module comparing the DLL filename information according to the cryptography DLL list to generate security encryption algorithm library (SEAL) filename information and being linked to a SEAL corresponding to the SEAL filename information to retrieve SEAL version information from a metadata of the SEAL; a specified SEAL storage unit having a plugin-equipped SEAL downloadable by the scanning module from the specified SEAL storage unit according to the SEAL filename information and version information and dedicated to replacing the SEAL; and a specified storage unit disposed in the electronic device to store log files created when the software app calls the plugin-equipped SEAL.

6 Claims, 5 Drawing Sheets comparing, by a comparison and analysis module, a blacklist with the log file to give notice or no notice according to a comparison result ⸺ f

FIG.2

METHOD AND SYSTEM OF IDENTIFYING SECURITY ENCRYPTION ALGORITHM

FIELD

The present disclosure relates to security encryption algorithm identification and monitoring, and more particularly to a method and system of identifying a security encryption algorithm.

BACKGROUND

Conventionally, software app developers use cryptography technology to encrypt data and then store or transmit the encrypted data to ensure the confidentiality and integrity of system data.

However, security pitfalls inevitably come into being in the course of software app development as a result of a poor understanding or the improper use of the types of cryptographic algorithms and call cryptography technology. Common mistakes include using cryptographic algorithms confronted with security issues or disadvantaged by inadequate encryption strength, using fixed values instead of random numbers as initial vectors of encryption algorithms, and applying keys which are not random to cryptographic algorithms.

In view of the aforesaid drawbacks of the prior art, it is important, from an information security perspective, to identify any cryptographic algorithms being currently used in a system. The conventional solution involves installing a monitoring program in an existing system, such as Android and iOS. The monitoring program operates in a high-privilege mode to monitor cryptographic algorithms, affecting framework services of the program operation (amending the system) without amending an APK file, such as Android package file, so as to produce a lot of robust modules that operate concurrently without functional conflicts, albeit at higher information security risks.

Furthermore, not only is it difficult to predict identifiable features of cryptographic algorithms being executed, but monitored contents also depend on system environment, program or hardware framework, rendering monitoring difficult.

Therefore, it is imperative to not only ensure system information security but also monitor cryptographic algorithms precisely and in real time.

Features and advantages of the disclosure are described below in detail to enable persons skilled in the art to understand the disclosed technical solutions and implement them accordingly. The description below, the claims and the accompanying drawings enable persons skilled in the art to easily understand the objectives and advantages of the disclosure.

SUMMARY

It is an objective of the disclosure to correctly identify, through a stored log file (comprising a software app name, call time, called function library name or called function name regarding calling a security encryption algorithm library), a security encryption algorithm function or security encryption algorithm function selectively used by a software app.

To achieve the above and other objectives, the disclosure provides a method of identifying a security encryption algorithm, comprising the steps of: a: scanning, by a scanning module, at least one dynamic-link library in an electronic device to obtain a dynamic-link library filename information; b: comparing, by the scanning module, the dynamic-link library filename information according to a cryptography dynamic-link library list to generate at least one security encryption algorithm library filename information; c: linking the scanning module to a security encryption algorithm library to obtain a metadata of the security encryption algorithm library and retrieve a security encryption algorithm library version information from the metadata; d: linking the scanning module to a specified security encryption algorithm library storage unit storing at least one security encryption algorithm library with a plugin, downloading the security encryption algorithm library with the plugin according to the security encryption algorithm library filename information and the security encryption algorithm library version information, and overwriting the security encryption algorithm library with the plugin on top of the security encryption algorithm library; and e: creating a log file corresponding to the security encryption algorithm library with the plugin and storing the log file in a specified storage unit of the electronic device when a software app calls the security encryption algorithm library with the plugin.

In an embodiment of the disclosure, the method further comprises the step f: comparing, by a comparison and analysis module, a blacklist with the log file to give notice or no notice according to a comparison result.

In an embodiment of the disclosure, the log file comprises a software app name, call time, called function library name or called function name regarding calling the security encryption algorithm library with a plugin.

The disclosure further provides a system of identifying a security encryption algorithm, for performing the method of identifying a security encryption algorithm. The system of the disclosure comprises: an electronic device on which a software app is installed, the electronic device comprising a storage unit being downloadable and dedicated to storing at least one dynamic-link library; a scanning module mounted on the electronic device to scan the dynamic-link library and obtain a dynamic-link library filename information; a cryptography dynamic-link library list, wherein the scanning module compares the dynamic-link library filename information according to the cryptography dynamic-link library list to generate at least one security encryption algorithm library filename information and is linked to a security encryption algorithm library corresponding to the security encryption algorithm library filename information to obtain a metadata of the security encryption algorithm library and retrieve a security encryption algorithm library version information from the metadata; a specified security encryption algorithm library storage unit having at least one security encryption algorithm library with a plugin, wherein the scanning module downloads a security encryption algorithm library with a plugin from the specified security encryption algorithm library storage unit according to the security encryption algorithm library filename information and the security encryption algorithm library version information, overwriting the security encryption algorithm library with a plugin on top of the security encryption algorithm library in the electronic device; and a specified storage unit disposed in the electronic device and adapted to store a log file created when the software app calls the security encryption algorithm library with a plugin.

In an embodiment of the disclosure, the system further comprises a comparison and analysis module and a blacklist, the comparison and analysis module comparing the blacklist information with the log file in the specified storage unit to give notice or no notice according to a comparison result.

In an embodiment of the disclosure, the log file comprises a software app name, call time, called function library name or called function name regarding calling the security encryption algorithm library with a plugin.

BRIEF DESCRIPTION OF THE DRAWINGS

FIG. 2 is a schematic view of the process flow of the additional step f of the method according to the disclosure.

DETAILED DESCRIPTION

The implementation of the disclosure is illustrated by specific embodiments to enable persons skilled in the art to easily understand the other advantages and effects of the disclosure by referring to the disclosure contained therein.

The structures, proportions, sizes depicted by the accompanying drawings of the disclosure are aimed at assisting persons skilled in the art in perusing and understanding the specification of the disclosure instead of defining the limitative conditions for the implementation of the disclosure and thus do not carry any substantial meanings technically. Thus, all modifications of structures, changes in proportions, and adjustments of sizes shall fall within the scope of the disclosure, provided that they do not affect the feasible advantages and achievable objectives of the disclosure. Moreover, related terms, such as "one", "two" and "above", used herein are illustrative rather than restrictive of the scope of the disclosure and thus shall fall within the scope of the disclosure, provided that the technical features of the disclosure remain substantially unaffected by whatever possible changes or adjustments in the meanings of the terms.

Figure 1:
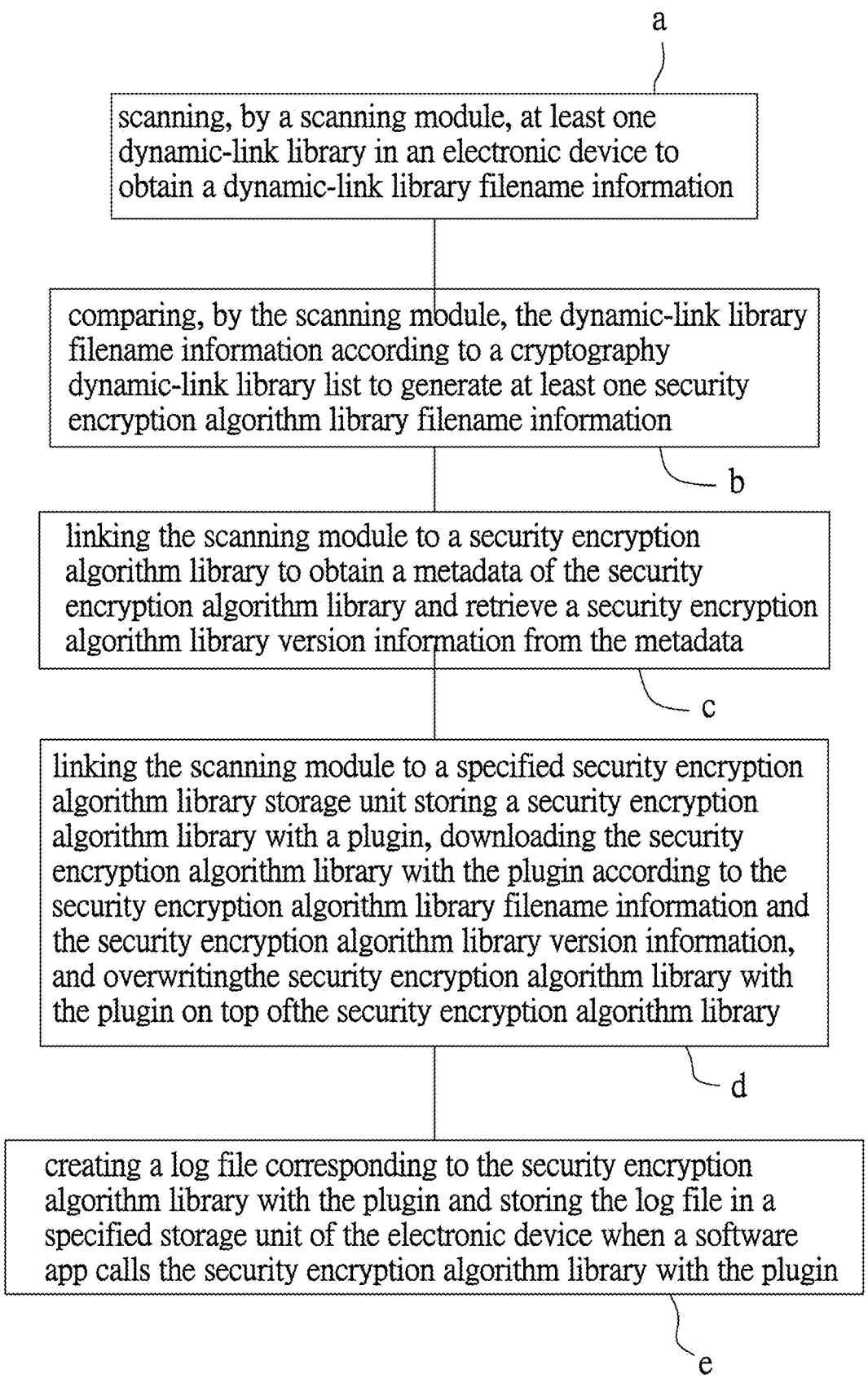
FIG. 1 is a schematic view of the process flow of an identification method of the disclosure.

Referring to FIG. 1 and FIG. 2, there are shown a schematic view of the process flow of an identification method of the disclosure and a schematic view of the process flow of the additional step f according to the disclosure respectively. The disclosure provides a method of identifying a security encryption algorithm, essentially comprising the steps described below.

Step a: scanning, by a scanning module, at least one dynamic-link library in an electronic device to obtain a dynamic-link library filename information.

The scanning module obtains filename information through a script or a software program capable of obtaining specific filename information. The scanning module identifies all dynamic-link library filename information in the electronic device according to extensions, i.e., identifies filenames that contain extensions dll, .ocx, .drv or .so. A filename consists of a file name and an extension. For example, libssl.so includes libssl as the file name and .dll as the extension, wherein libssl is a function library for use in performing safe communication and precluding eavesdropping. Furthermore, step a. is effective in identifying dynamic-link libraries available to the electronic device.

Step b: comparing, by the scanning module, the dynamic-link library filename information according to a cryptography dynamic-link library list to generate at least one security encryption algorithm library filename information.

The cryptography dynamic-link library list contains file names of multiple security encryption algorithm libraries, for example, libssl. The scanning module compares the file name of any security encryption algorithm library included in the cryptography dynamic-link library list with the dynamic-link library filename information to generate at least one security encryption algorithm library filename information in the event of a close match, for example, in the situation where the file name of the security encryption algorithm library in the cryptography dynamic-link library list is libssl, when the dynamic-link library filename information contains libssl, libssl serves as security encryption algorithm library filename information. By contrast, if the dynamic-link library filename does not contain libssl, the security encryption algorithm library filename information will not be generated. Furthermore, step b. is effective in identifying security encryption algorithm libraries currently available in the dynamic-link libraries according to the cryptography dynamic-link library list.

Step c: linking the scanning module to a security encryption algorithm library to obtain a metadata of the security encryption algorithm library and retrieve a security encryption algorithm library version information from the metadata.

The scanning module is linked to a security encryption algorithm library corresponding to the security encryption algorithm library filename information and disposed in the electronic device to obtain version information in its metadata. For example, where the security encryption algorithm library filename information is libssl, the scanning module is linked to libssl.dll to obtain version information in its metadata, for example, version 1.01. Furthermore, step c is effective in identifying the version of the security encryption algorithm library currently used by the electronic device.

Step d: linking the scanning module to a specified security encryption algorithm library storage unit storing a security encryption algorithm library with a plugin, downloading the security encryption algorithm library with the plugin according to the security encryption algorithm library filename information and the security encryption algorithm library version information, and overwriting the security encryption algorithm library with the plugin on top of the security encryption algorithm library.

Take libssl as an example, after filename information libssl and version information version 1.01 have been obtained, the scanning module is linked to the specified security encryption algorithm library storage unit and downloads a security encryption algorithm library with a plugin according to filename information libssl and version information version 1.01, that is, libssl.dll 1.01 in this example. The plugin in the security encryption algorithm library with a plugin can be a function, whose purpose is to allow the security encryption algorithm library with a plugin to leave a log file when executed. Upon completion of the downloading process, libssl.dll 1.01 in the electronic device is replaced with libssl.dll 1.01 with a plugin.

Step e: creating a log file corresponding to the security encryption algorithm library with the plugin and storing the log file in a specified storage unit of the electronic device when a software app calls the security encryption algorithm library with the plugin.

The log file comprises a software app name, call time, called function library name or called function name regarding calling a security encryption algorithm library with a plugin.

The method further comprises the step f: comparing, by a comparison and analysis module, a blacklist with the log file to give notice or no notice according to a comparison result.

The comparison and analysis module links a blacklist and the specified storage unit and compares blacklist information with the log file in the specified storage unit to give notice or no notice according to a comparison result. The blacklist is an impermissible list that comprises information about non-post-quantum cryptography encryption algorithms, such as names and codes of non-post-quantum cryptography encryption algorithms. The data integration program collects the log file and compares information in the blacklist with a called function library name or called function name in the log file. Notice is given when a called function library name or called function name matches information about a non-post-quantum cryptography encryption algorithm in the blacklist. The comparison and analysis module determines, mainly through the blacklist, whether the electronic device uses insecure security encryption algorithm libraries, namely encryption algorithms not based on quantum cryptography.

Figure 3:
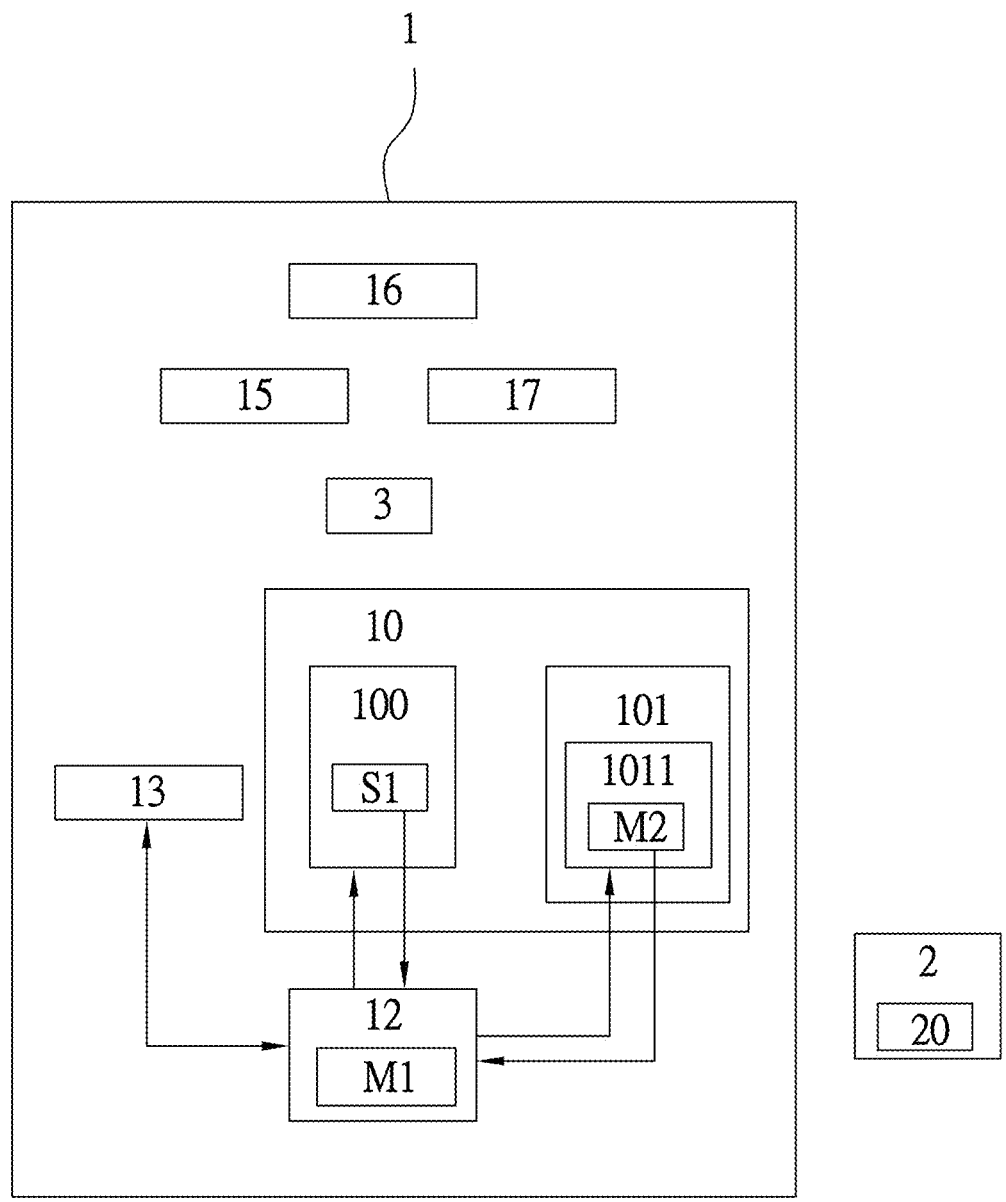
FIG. 3 is a block diagram of downloading a security encryption algorithm library with a plugin according to the disclosure.
Figure 4:
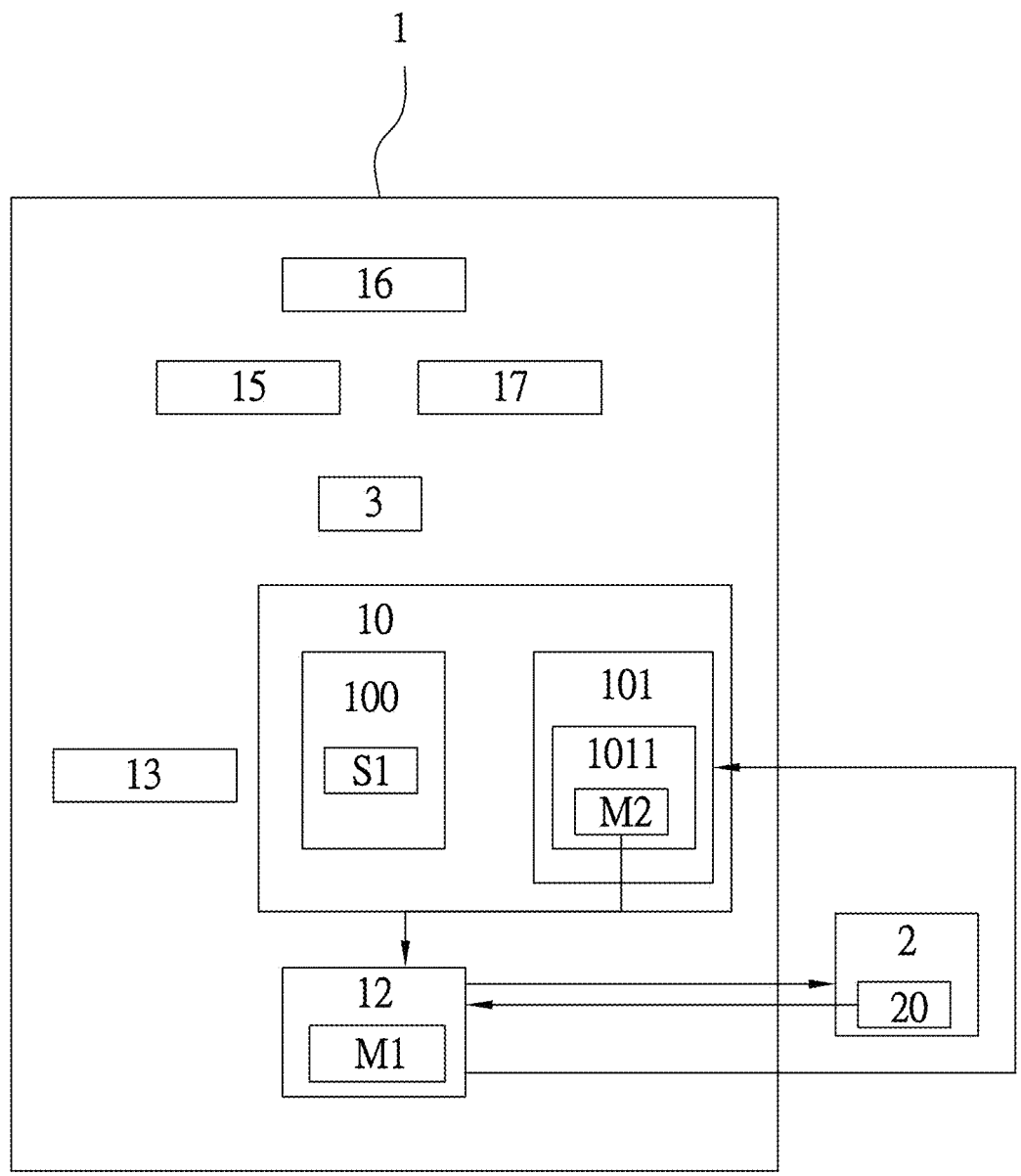
FIG. 4 is a block diagram of overwriting a security encryption algorithm library with a plugin on top of a security encryption algorithm library according to the disclosure.
Figure 5:
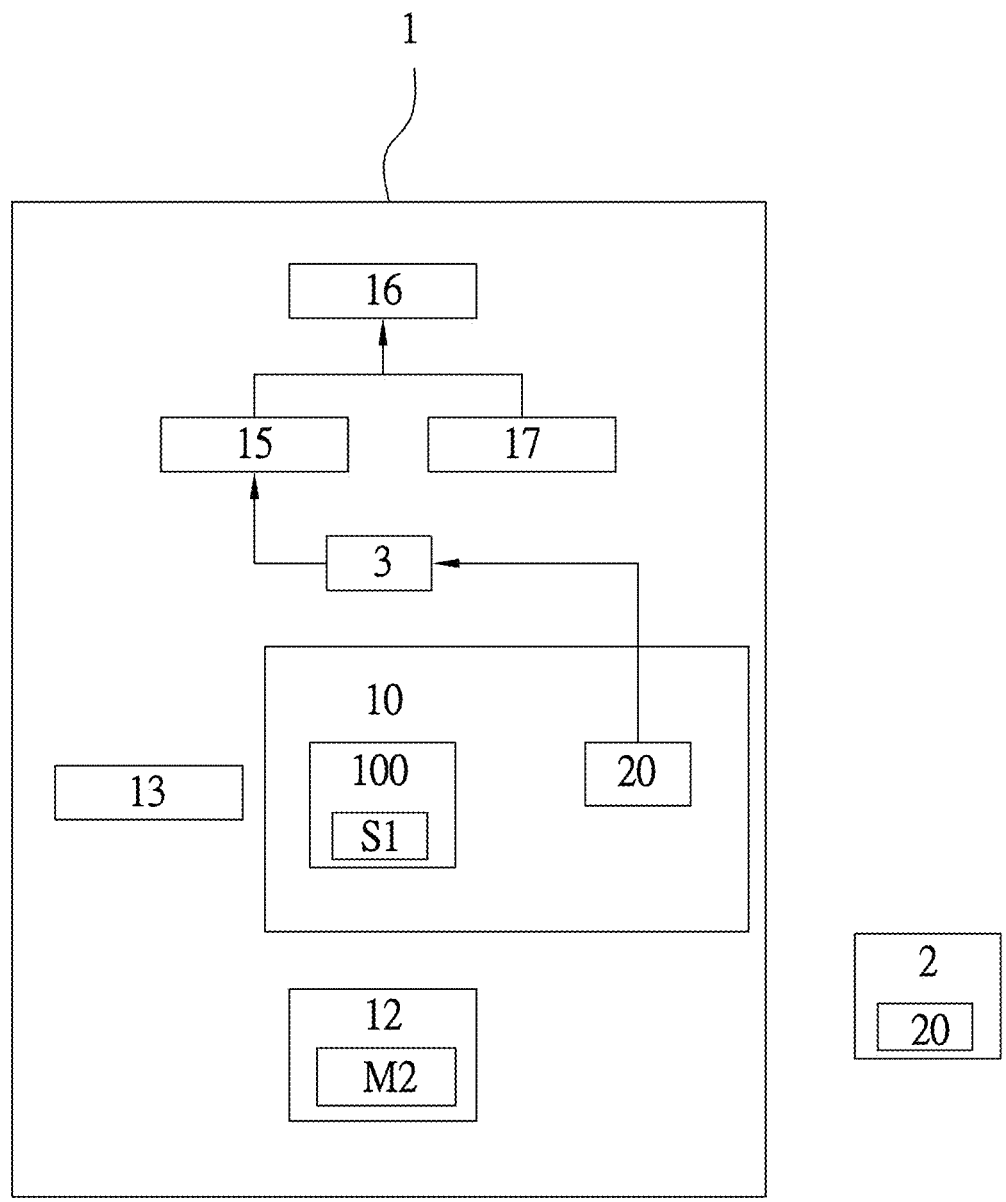
FIG. 5 is a block diagram of storing a log file in uniform format according to the disclosure.

The steps of the method of identifying a security encryption algorithm according to the disclosure are described above. Referring to FIG. 3, FIG. 4 and FIG. 5, there are shown a block diagram of downloading a security encryption algorithm library with a plugin according to the disclosure, a block diagram of overwriting a security encryption algorithm library with a plugin on top of a security encryption algorithm library according to the disclosure, and a block diagram of storing a log file in uniform format according to the disclosure.

The disclosure further provides a system of identifying a security encryption algorithm, for performing the method of identifying a security encryption algorithm. The system of the disclosure comprises an electronic device 1 on which a software app 3 is installed. The electronic device 1 comprises a storage unit 10 being downloadable and dedicated to storing at least one dynamic-link library 100. A scanning module 12 is mounted on the electronic device 1 to scan the dynamic-link library 100 and obtain a dynamic-link library filename information S1.

The scanning module 12 information-links a cryptography dynamic-link library list 13 and the storage unit 10 and compares the dynamic-link library filename information S1 in the storage unit 10 according to the cryptography dynamic-link library list 13 to generate at least one security encryption algorithm library filename information M1.

The scanning module 12 is information-linked to a security encryption algorithm library 101 to obtain a metadata 1011 of a security encryption algorithm library 14 and retrieve a security encryption algorithm library version information M2 from the metadata 1011. The scanning module 12 is linked to a security encryption algorithm library 101 disposed in the electronic device 1 and corresponding to the security encryption algorithm library filename information M1, and the security encryption algorithm library 101 is in the number of one or more in the dynamic-link library 100.

Next, the scanning module 12 is linked to a specified security encryption algorithm library storage unit 2 which has at least one security encryption algorithm library 20 with a plugin and downloads the security encryption algorithm library 20 with a plugin according to security encryption algorithm library filename information M1 and security encryption algorithm library version information M2, overwriting the security encryption algorithm library 20 with a plugin on top of the security encryption algorithm library 101.

Calling, by the software app 3, the security encryption algorithm library 20 with a plugin results in creating a log file corresponding to the security encryption algorithm library 20 with a plugin and storing the log file in a specified storage unit 15 of the electronic device. The log file comprises a software app name, call time, called function library name or called function name regarding calling the security encryption algorithm library with a plugin. A comparison and analysis module 16 links a blacklist 17 and the specified storage unit 15 and compares information of the blacklist 17 with the log file in the specified storage unit 15 to give notice or no notice according to a comparison result.

Therefore, the stored log file (comprising a software app name, call time, called function library name or called function name regarding calling a security encryption algorithm library with a plugin) is effective in correctly identifying a security encryption algorithm library or security encryption algorithm function selectively used by a software app and giving notice of use of any insecure security encryption algorithm.

The aforesaid embodiments are merely illustrative of the principle and advantages of the disclosure rather than restrictive of the disclosure. Persons skilled in the art can amend the aforesaid embodiments without departing from the spirit and scope of the disclosure. Therefore, the scope of the disclosure shall be defined by the appended claims.

What is claimed is:

1. A method of identifying a security encryption algorithm, comprising the steps of:
   a: scanning, by a scanning module, at least one dynamic-link library in an electronic device to obtain a dynamic-link library filename information;
   b: comparing, by the scanning module, the dynamic-link library filename information according to a cryptography dynamic-link library list to generate at least one security encryption algorithm library filename information;
   c: linking the scanning module to a security encryption algorithm library to obtain a metadata of the security encryption algorithm library and retrieve a security encryption algorithm library version information from the metadata;
   d: linking the scanning module to a specified security encryption algorithm library storage unit storing at least one security encryption algorithm library with a plugin, downloading the security encryption algorithm library with the plugin according to the security encryption algorithm library filename information and the security encryption algorithm library version information, and overwriting the security encryption algorithm library with the plugin on top of the security encryption algorithm library; and
   e: creating a log file corresponding to the security encryption algorithm library with the plugin and storing the log file in a specified storage unit of the electronic device when a software app calls the security encryption algorithm library with the plugin.

2. The method of claim 1, further comprising the step f: comparing, by a comparison and analysis module, a blacklist with the log file to give notice or no notice according to a comparison result.

3. The method of claim 1, wherein the log file comprises a software app name, call time, called function library name or called function name regarding calling the security encryption algorithm library with a plugin.

4. A system of identifying a security encryption algorithm, for performing the method of claim 1, the system comprising:
   an electronic device on which a software app is installed, the electronic device comprising a storage unit being downloadable and dedicated to storing at least one dynamic-link library;
   a scanning module mounted on the electronic device to scan the dynamic-link library and obtain a dynamic-link library filename information;
   a cryptography dynamic-link library list, wherein the scanning module compares the dynamic-link library filename information according to the cryptography dynamic-link library list to generate at least one security encryption algorithm library filename information and is linked to a security encryption algorithm library corresponding to the security encryption algorithm library filename information to obtain a metadata of the security encryption algorithm library and retrieve a security encryption algorithm library version information from the metadata;
   a specified security encryption algorithm library storage unit having at least one security encryption algorithm library with a plugin, wherein the scanning module downloads a security encryption algorithm library with a plugin from the specified security encryption algorithm library storage unit according to the security encryption algorithm library filename information and the security encryption algorithm library version information, overwriting the security encryption algorithm library with a plugin on top of the security encryption algorithm library in the electronic device; and
   a specified storage unit disposed in the electronic device and adapted to store a log file created when the software app calls the security encryption algorithm library with a plugin.

5. The system of claim 4, further comprising a comparison and analysis module and a blacklist, the comparison and analysis module comparing the blacklist information with the log file in the specified storage unit to give notice or no notice according to a comparison result.

6. The system of claim 4, wherein the log file comprises a software app name, call time, called function library name or called function name regarding calling the security encryption algorithm library with a plugin.

* * * * *